United States Patent [19]

Millar

[11] Patent Number: 4,620,789

[45] Date of Patent: Nov. 4, 1986

[54] ENDFACE ASSESSMENT

[75] Inventor: Colin A. Millar, Felixstowe, England

[73] Assignee: British Telecommunications plc, United Kingdom

[21] Appl. No.: 738,711

[22] Filed: May 29, 1985

[30] Foreign Application Priority Data

May 30, 1984 [GB] United Kingdom ............... 8413781

[51] Int. Cl.⁴ .................. G01N 21/84; G01B 11/26
[52] U.S. Cl. .................................. 356/73.1; 356/154
[58] Field of Search .............. 356/73.1, 138, 154

[56] References Cited

PUBLICATIONS

Millar, "A Measurement Technique for Optical Fibre Break Angles", *Optical & Quantum Electronics* 13, (1981), pp. 125–131.

*Primary Examiner*—Vincent P. McGraw
*Attorney, Agent, or Firm*—Nixon & Vanderhye

[57] ABSTRACT

Features of the endface of a dielectric member are assessed by means of a reflected diffraction pattern.

A plurality of light beams 6, 7 which intersect in a region containing the endface 8 can be used to generate a diffraction pattern 10 which subtends an angle of at least 180° at the endface 8. Such a diffraction pattern 10 contains information about the endface 8 and may be used, in particular, to locate the plane in which the endface 8 lies.

Embodiments of the invention find particular application in the measurement of endface angles of optical fibres.

11 Claims, 3 Drawing Figures

ENDFACE ASSESSMENT

The present invention relates to the assessment of the endfaces of dielectric members and finds particular application in the measurement of cleaved optical fibre endface angles.

The quality of the endface of an optical fibre can be highly important, particularly in fibre splicing and in laboratory or field measurements. A non-perpendicular endface can introduce serious misalignment at a fibre splice while a number of factors can affect the transmission of light through the end of the fibre.

Fibre endfaces are commonly produced by cleaving, using dedicated cleaving apparatus. The endface so produced is generally planar and typically lies at an angle of up to about 3° from the perpendicular to the fibre axis. Methods for assessing the endface of an optical fibre which can be used to measure the endface angle are clearly useful, particularly for instance before a splice is made or in the development and monitoring of cleaving apparatus.

A published method of assessing the quality of a fibre end, particularly in terms of the endface angle, relies on the combination of the angle of reflection of light at the endface and diffraction. This method is described in the following paper: "A measurement technique for optical fibre break angles", C. A. Millar, Opt. Quant., 13 pp. 125-131 (1981).

In the published method, a laser beam is directed at the end portion of an optical fibre, at a known angle of slightly less than 90° to the fibre axis, such that at least part of the beam is reflected by the internal surface of the fibre endface. The pattern of light reflected by the endface is viewed on a screen and the position of the pattern on the screen gives an indication of the angle between the incident laser beam and the endface. The endface angle, i.e. that between the endface and the fibre axis, can then be determined from the angle between the laser beam and the fibre.

The form of the pattern, independently of its position, can also be used to assess features of the condition of the endface where it deviates from a plane, mirror finish. Such features might include chipping, hackle or dirt.

The wavelength of the laser beam is selected such that the width of the endface encountered by the beam is of the order of a few wavelengths, the light reflected by the endface therefore also being diffracted. For example, a He Ne laser of wavelength 0.633 $\mu$m may be used with optical fibres of outer diameter 125 $\mu$m. The far field of the diffraction pattern which can be viewed on the screen as a result consists of a series of lines. By selecting a line of the pattern, generally the most intense, central line, the angle between the incident laser beam and the plane of the endface, and therefore the fibre endface angle, can be assessed to a significant degree of accuracy.

However, the angle between the incident laser beam and the plane of the endface varies according to the rotational position of the fibre relative to the laser beam. That is, if the fibre were to rotate about its own axis, and the beam to remain stationary, the above angle would vary periodically. In order to obtain an accurate measurement of the actual endface angle without having to know the precise rotational position of the fibre relative to the beam, the fibre is rotated continuously and the measured maximum deflection of the selected diffraction line on the screen is used to estimate the endface angle.

A significant disadvantage of the above arrangement is that precision moving parts must be provided. Further, it is impractical for use with fibres already carried in optical fibre cables or otherwise attached to equipment which cannot readily be rotated.

It is an object of the present invention to provide apparatus which may be used to measure accurately the endface angles of optical fibres but which need incorporate no moving parts.

According to a first aspect of the present invention, apparatus for use in assessing endfaces of dielectric members comprises means for mounting a dielectric member such that its end portion is exposed, means for directing collimated light from a plurality of directions onto the inner surface of the endface of a member mounted in the mount, each such direction being fixed relative to the endface, such as to generate a diffraction pattern which subtends an angle of not less than 180° at the endface, and means to detect at least part of a diffraction pattern so generated.

Apparatus embodying the present invention can be small, portable and easy to use while being capable of providing a resolution in the measurement of endface angles of better than 0.25°. Because it is not necessary to provide precision moving parts, such apparatus can be relatively simple to manufacture and, further, it can be used with dielectric members which are substantially non-rotatably mounted.

If each of the plurality of directions lies at the same angle to the endface, then the diffraction pattern generated is generally easier to detect and interpret. Contributions made to the pattern by light from different ones of the plurality of directions will overlap and reinforce each other.

If the means for directing light comprises means for directing two mutually orthogonal laser beams to intersect in a region containing the endface, then a useful diffraction pattern may be generated by employing a conveniently simple arrangement of apparatus.

Where the arrangement is such that the diffraction pattern comprises a first part and a second part, the first part being generated by light transmitted through the dielectric member and reflected at the endface and the second part being generated by light transmitted through the dielectric member without reflection at the endface, the second part may conveniently be used to supply a reference marker in making measurements of the position of the first part.

According to a second aspect of the present invention, a method of assessing the endface of a dielectric member comprises the steps of mounting the dielectric member such that its end portion is exposed, directing collimated light from a plurality of directions onto the inner surface of the endface of the member, each such direction being fixed relative thereto, such as to generate a diffraction pattern which subtends an angle of not less than 180° at the endface, and detecting the pattern so generated.

An optical fibre endface angle measurement device will now be described as an embodiment of the invention, by way of example only, with reference to the accompanying drawings in which.

Figure 1:
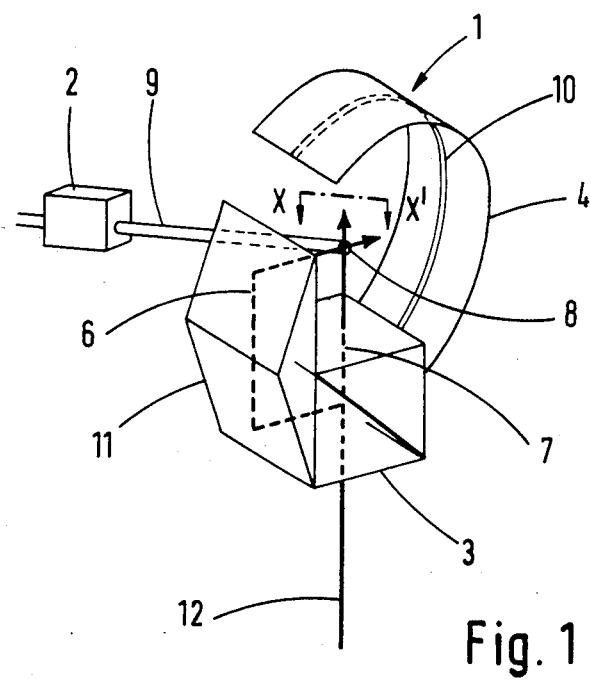
FIG. 1 shows a perspective view of the measurement device.

Referring to FIG. 1, the measurement device 1 comprises an optical fibre clamp 2, beam splitting and directing equipment 3, 11, and an arcuate screen 4. In use, an optical fibre 9 is mounted in the clamp 2 and two mutually orthogonal light beams 6, 7, directed by the beam splitting and directing equipment 3, 11, are arranged to intersect in the region of the endface 8 of the optical fibre 9. A resultant diffraction pattern 10 (shown schematically) can be made visible on the screen 4. Measurements taken from the diffraction pattern 10 on the screen 4 can then be used to assess the endface angle of the fibre 9.

It should be noted that the pattern which is visible on the screen 4 is not produced only by diffractive effects. It is referred to herein as a diffraction pattern 10 however, for convenience.

In more detail the arrangement is as follows.

Optical fibre clamps are known and any suitable clamp 2 may be used to mount the end portion of an optical fibre 9. In this embodiment as an example a clamp of a type having a v-groove co-operating with a resilient pad is employed.

The optical fibre 9 is mounted in the clamp 2 such that an end portion, measuring between 5 mm and 10 mm from the endface 8, projects clear of the clamp 2. The end portion, including the endface 8, of the fibre 9 is thus exposed.

Conventional beam splitting and directing equipment 3, 11, is provided, comprising a beam splitting cube 3 and an internally reflecting prism 11. A laser beam 12 is directed to be incident on the beam splitting cube 3 such that the beam 12 is converted into two mutually orthogonal beams 6, 7 which intersect in a region containing the fibre endface 8. The beams 6, 7 are incident on the inner surface of the endface 8, having first passed into the fibre end portion through the wall of the fibre 9.

At a distance of 8 cm from the fibre 9, beyond the fibre endface 8 with respect to the two beams 6, 7, is positioned the arcuate screen 4. The screen 4 is constructed out of a light diffusing material, such as sandblasted perspex or infilled glass, which is bent to form part of a cylinder whose axis passes through the fibre endface 8. The edges of the screen 4 which are parallel to the cylinder's axis subtend between them an angle of slightly more than 180° at the endface 8 and are disposed symmetrically with respect to the two beams 6, 7, being perpendicular thereto.

The screen 4 provides a back-illuminated viewing surface for the far field of the diffraction pattern 10. The distance between the screen 4 and the fibre 9 may be varied but in general, as will be clear to a man skilled in the art, in order to view the far field rather than the near field of the diffraction pattern 10, that distance should generally be equivalent to at least a few hundred wavelengths of the incident light employed.

The clamp 2 in which the fibre 9 is mounted, and the beam splitting and directing equipment 3, 11, are both mounted on a common machined block (not shown). The arrangement is such that the position of the clamp 2, and therefore of the fibre 9 mounted in it, can be adjusted to a preselected angular relationship with each of the two othogonal beams 6, 7. In the embodiment described above, both beams 6, 7 lie at an angle of 80° to the fibre axis. The clamp 2 is mounted so that its position can also be adjusted in a direction along the fibre axis. For instance, the clamp mounting may be based on a dovetail groove arrangement or a roller bearing.

To use the measurement device 1 an optical fibre 9 is mounted in the clamp 2, the angular relationship between the fibre 9 and the two beams 6, 7 being arranged to be the 80° mentioned above. The spot size of each beam 6, 7 is generally between 0.5 mm and 1.0 mm and the diameter of the fibre 9 is 125 $\mu$m. The clamp 2 can therefore conveniently be moved manually in the direction along the fibre's axis to bring the endface 8 of the fibre 9 into the region of intersection of the two beams 6, 7. The resultant diffraction pattern 10 which can be viewed on the screen 4 can then be used to assess the endface angle.

Figure 2:
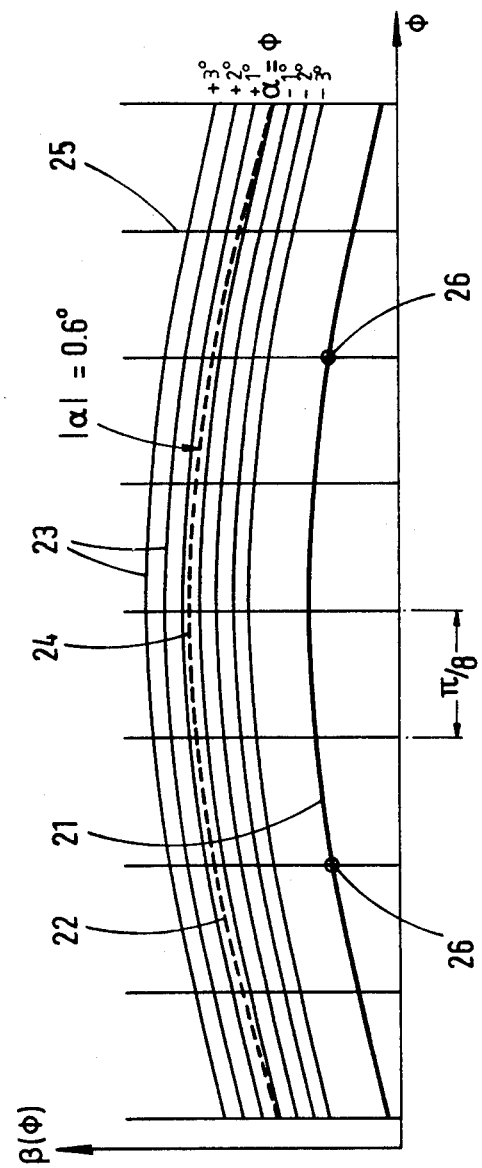
FIG. 2 shows an example of a developed diffraction pattern which may be obtained on an arcuate screen with the measurement device of FIG. 1.

Referring to FIG. 2, the form of the diffraction pattern 10 produced with the above arrangement is substantially that of two slightly curved lines 21, 22 which extend along the screen in the direction of its longest dimension.

In order that the use of embodiments of the invention be better understood, a more detailed explanation of the form of the diffraction pattern 10 is now given.

Figure 3:
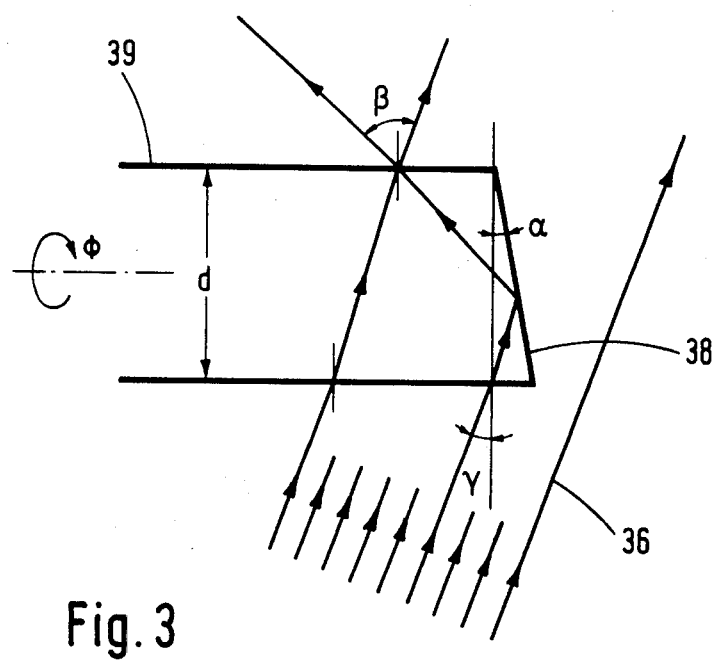
FIG. 3 shows schematically an enlarged cross-section taken along the line x-x' in FIG. 1.

Referring to FIG. 3, if an optical beam 36 is incident on the end portion of an optical fibre 39, at 80° to the fibre's axis and such that the endface 38 of the fibre 39 falls within the beam 36, then an optical pattern will be generated. That pattern will generally include (a) light which has passed through the fibre 39, (b) light which has been reflected by the inner surface of the endface 38, and (c) light which has passed by the fibre completely. The light (a) and (b) provide the two slightly curved lines 21, 22 of the diffraction pattern 10 while the light (c) makes no contribution of particular interest. The distance between the two lines 21, 22, however, gives an indication of the angular separation of (a) and (b) and hence of the fibre endface angle.

If $\gamma$ is the angle between the incident beam 36 and the perpendicular to the fibre axis which lies in the same plane, n is the refractive index of the fibre 39, $\alpha$ is the fibre endface angle, $\beta$ is the angle of emergence of (b) above with respect to (a), and $\phi$ is the angle through which the fibre 39 would have to be rotated about its axis to bring $\beta$ to a maximum value then $$\beta(\phi) \approx 2n\alpha\cos.\phi + 2\gamma.$$

If, as mentioned above, the wavelength $\lambda$ of the incident beam 36 is selected such that the aperture presented to it by the endface 38 of a fibre 39 of diameter d is sufficiently small, then diffraction will also occur. In the far field, the light (b) appears as a pattern which, in the plane of the cross-section of FIG. 3, approximates to a sinc squared function of angular width (peak to first zero)

$$\Delta\beta \approx \frac{\lambda n}{d \sin \gamma}$$

As a result of the above diffraction effect, (b) as viewed on a screen has a clearly defined central peak intensity, in the plane of said cross-section, the middle point of which has been routinely estimated in practice to within $\Delta\beta/3$. By measuring the distance between this peak intensity, and the line 21 produced by the light (a), $\beta(\phi)$ can be calculated by simple trigonometry.

It will be clear however that $\beta(\phi)$ cannot be used directly to give a value of $\alpha$ independent of $\phi$.

By taking the difference between the maximum and minimum values of $\beta$ produced as $\phi$ varies through 360°, both $\phi$ and $\gamma$ can be avoided in the approximation given for $\beta(\phi)$. This is because the values of $\phi$ at maximum and minimum $\beta$ will be 0° and 180° respectively giving $$\beta(0°) - \beta(180°) = \beta\text{diff} \approx 4n\alpha,$$

from which the value of $\alpha$ can clearly be obtained.

The diffraction pattern produced from a dielectric cylinder using a single incident laser beam, as shown in FIG. 3, is distributed over $2\pi$ radians in the far field. However the intensity at 90° to the incident beam is too low in practice for measurements of both $\beta(0°)$ and $\beta(180°)$ to be made. By using the two orthogonal beams 6, 7 shown in FIG. 1, the diffraction pattern 10 produced is rendered sufficiently visible for the measurements to be made.

Referring again to FIG. 2, the diffraction pattern shows a first line 21, which is derived from the light (a) which merely passes through the optical fibre 9, and a second line 22, the "sample line", which is derived from the light (b) which is reflected at the endface 8. The first line 21 provides a convenient reference against which to make measurements of $\beta$. To calculate $\alpha$ the difference between the maximum and minimum separations of the two lines 21 and 22 could be measured, converted to a value for $\beta$ diff and inserted in the relationship derived above, $$\text{wherefrom } \alpha = \frac{\beta \text{ diff}}{4n}$$

However, a particularly convenient method of arriving at the value of $\alpha$ is to use a detachable, calibrated sheet on the screen which is marked with a series of lines 23 parallel to the reference line 21. Each line 23 lies at a distance equivalent to $\beta(0°)$ or $\beta(180°)$ for a selected value of $\alpha$. For example, as shown, lines 23 may be provided for integral values of $\alpha$ from 0° to 3°. Using such a calibrated sheet allows a value for $\alpha$ to be read directly from the position of the point of maximum deviation 24 of the sample line 22 from the calibration line for $\alpha = 0°$ (i.e. the central line; see below). The reading of $\alpha$ that would be obtained from the sample line 22 shown in FIG. 2 would be 0.6°.

The calibration lines 23 must be provided for apparently negative values of $\alpha$ as well as for positive values because the screen 4 only shows a little more than 180° of the diffraction pattern 10. Only one of $\beta(0°)$ and $\beta(180°)$ will generally therefore be represented and the point of maximum deviation may appear on either side of the (central) calibration line for $\alpha = 0°$.

As would be expected, each incident laser beam 6, 7 produces a spot 26 on the screen 4, marking its undeflected position. These spots 26 are relatively intense and may be blanked out by conventional methods if desired. Further, the reference line 21 itself, which is also relatively intense, may be blanked out if, say, a calibrated sheet is being used. Alternatively, the reference line 21 may be replaced by an artificial, drawn reference line.

It is not necessary that two mutually orthogonal beams be provided. Other arrangements such as more than two beams spaced by smaller angles could be used, or two beams at an angle of other than 90° to each other. Whatever arrangement is selected however a visible diffraction pattern subtending at least 180° at the sample endface should be produced. The calibrated sheet, as shown in FIG. 2, may further usefully include parallel lines 25 spaced at $\pi/8$ intervals with respect to that 180°.

The resolution r of the endface angle measurement device described above can be calculated from $$r = \Delta\beta \cdot \frac{d\alpha}{d\beta}$$

Using the approximations for $\beta(\phi)$ and $\Delta\beta$ given above, one derives $$r = \frac{\lambda n}{9d\sin\gamma}$$

Typical values (d=125 $\mu$m, $\mu$=0.633 $\mu$m, n=1.46, $\lambda$=10°) give r=0.25°.

Endfaces which are not plane produce irregular $\phi$-variations, and damage such as chips, hackle and dirt are revealed as discontinuities, ribbing and smudging respectively in the diffraction pattern. An operator may therefore be able to distinguish features in addition to endface angle, although if surface disturbances are too large interpretation of the results becomes difficult.

It is not necessary that the dielectric member concerned have a circular cross-section. This aspect of embodiments of the invention gives significant advantages over arrangements wherein the member and the beam must rotate relative to one another to obtain a measurement. For instance embodiments of the present invention could be used to measure the endface angle of a dielectric member of elliptical or rectangular cross-section.

Although in the embodiment described with reference to FIG. 1 the incident beams 6, 7 each lie at an angle of 80° to the fibre axis, it may not always be necessary that both angles be the same. However the interpretation of the diffraction pattern 10 is considerably easier, and its visibility on the screen 4 improved, if they are. The contributions made to the diffraction pattern 10 by each beam 6, 7 will only adjoin each other to give continuous lines when the two beams 6, 7 are aligned and this feature can be used to align the two beams.

The incident angle at the endface 8 for each beam 6, 7 can lie anywhere in the range from greater than 0° to up to and including 25°. If the incident angle equals 0°, then other diffraction effects come into play while at the other end of the range, as the incident angle increases, the approximations used become less accurate.

In the embodiment described, the end portion of the fibre which is exposed from the clamp measures between 5 mm and 10 mm long. However, other lengths may be found convenient, the minimum length required being determined generally by the dimensions of the incident light beams and the dielectric member concerned.

Although a laser beam 12 is described above, any light source could be substituted provided that the light produced is collimated and of sufficient intensity at a particular wavelength to give a diffraction pattern of the type described. Further, it will be clear that the dielectric member concerned must be transparent at that particular wavelength.

Embodiments of the invention may be found useful in assessing non-planar endfaces but, in general, the diffraction pattern produced by a non-planar endface is likely to be less easy to interpret than the one described above. Interpretation is also likely to be hampered by reduced local intensities of the diffraction pattern.

I claim:

1. Apparatus for use in assessing endfaces of dielectric members, comprising means for mounting a dielectric member such that its end portion is exposed, means for directing collimated light from a plurality of directions onto the inner surface of the endface of the member, each such direction being fixed relative to the endface, such as to generate a diffraction pattern which subtends an angle of not less than 180° at the endface, and means to detect at least part of a diffraction pattern so generated.

2. Apparatus according to claim 1 wherein said directions each lie at an angle in the range from greater than 0° up to and including 25° to the endface.

3. Apparatus according to claim 2 wherein said directions each lie at the same angle to the endface.

4. Apparatus according to any one of claims 1 to 3 wherein the means for directing light comprises means for directing two mutually orthogonal laser beams to intersect in a region containing the endface.

5. Apparatus according to claim 1, 2, or 3 wherein the diffraction pattern comprises a first part and a second part, the first part being generated by light transmitted through the dielectric member and reflected at the endface and the second part being generated by light transmitted through the dielectric member without reflection at the endface.

6. Apparatus according to claim 1, 2, or 3 wherein the means to detect comprises a substantially hemicylindrical screen whose axis intersects the endface and lies perpendicular to each preselected direction.

7. Apparatus according to claim 1, 2 or 3 wherein the light is monochromatic.

8. A method of assessing the endface of a dielectric member which comprises the steps of mounting the dielectric member such that its end portion is exposed, directing collimated light from a plurality of directions onto the inner surface of the endface of the member, each such direction being fixed relative thereto, such as to generate a diffraction pattern which subtends an angle of not less than 180° at the endface, and detecting the pattern so generated.

9. A method according to claim 8 which further comprises the step of measuring the distance between a portion of the diffraction pattern and a reference marker.

10. A method according to claim 9 wherein the diffraction pattern comprises first part and a second part, the first part being generated by light transmitted through the dielectric member and reflected at the endface, and the second part being generated by light transmitted through the dielectric member without reflection at the end face, the first part being said portion and the second part being said reference marker.

11. A method according to claims 9 or 10 further comprising the step of calculating the endface angle of the dielectric member from the measurement.

* * * * *